US011320586B2

(12) United States Patent
Tortschanoff et al.

(10) Patent No.: US 11,320,586 B2
(45) Date of Patent: May 3, 2022

(54) BANDPASS TRANSMISSION FILTER AND NARROWBAND RADIATION SOURCE

(71) Applicant: Infineon Technologies AG, Neubiberg (DE)

(72) Inventors: Andreas Tortschanoff, Villach (AT); Cristina Consani, Villach (AT); Thomas Grille, Villach (AT); Bernhard Jakoby, Linz (AT); Christian Ranacher, Gaimberg (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 63 days.

(21) Appl. No.: 16/810,442

(22) Filed: Mar. 5, 2020

(65) Prior Publication Data

US 2020/0284956 A1 Sep. 10, 2020

(30) Foreign Application Priority Data

Mar. 8, 2019 (EP) .................................... 19161714

(51) Int. Cl.
*G02B 6/12* (2006.01)
*G02B 6/34* (2006.01)
(Continued)

(52) U.S. Cl.
CPC ..... *G02B 6/12007* (2013.01); *G02B 6/02085* (2013.01); *G02B 6/29389* (2013.01);
(Continued)

(58) Field of Classification Search
CPC ............... G02B 6/02085; G02B 6/124; G02B 6/29389; G02B 6/34; G02B 2006/12109
See application file for complete search history.

(56) References Cited

U.S. PATENT DOCUMENTS

| 3,814,498 A | 6/1974 | Tomlinson, III et al. |
| 5,949,934 A * | 9/1999 | Shima .................... G02B 6/021 385/37 |

(Continued)

FOREIGN PATENT DOCUMENTS

| JP | H09311238 A | 12/1997 |
| JP | 3346440 B2 | 11/2002 |

OTHER PUBLICATIONS

Kwon, Seo Won et al., "Bandwidth Controllable Filter using the Chirped Fiber Bragg Gratings", XP 055616047, Feb. 21, 1999.
Murtaza, G., et al., "Intensity Modulated Optical Fibre Sensor System for Measuring up to 20 mm of Linear Displacement", IEEE Colloquium on Fibre Sensor Technology, May 29, 1992, 6 pages.

(Continued)

*Primary Examiner* — Daniel Petkovsek
(74) *Attorney, Agent, or Firm* — Slater Matsil, LLP

(57) ABSTRACT

In accordance with an embodiment, a bandpass transmission filter having a center wavelength of transmission includes: a waveguide structure comprising a grating structure having changing grating pitch values configured to diffract radiation in the waveguide structure having a first wavelength lower than the center wavelength of transmission, and configured to reflect radiation in the waveguide structure having a second wavelength higher than the center wavelength of transmission; and a radiation absorbing structure configured to absorb radiation guided by the waveguide structure having a third wavelength higher than the second wavelength, wherein the radiation absorbing structure is an integrated part of the waveguide structure or comprises a layer arranged adjacent to the waveguide structure.

16 Claims, 13 Drawing Sheets

(51) Int. Cl.
   *G02B 6/293* (2006.01)
   *G02B 6/02* (2006.01)
   *G02B 6/42* (2006.01)
   *G02B 5/20* (2006.01)
   *G02B 6/124* (2006.01)

(52) U.S. Cl.
   CPC ............ *G02B 6/34* (2013.01); *G02B 6/4215* (2013.01); *G02B 5/208* (2013.01); *G02B 6/124* (2013.01); *G02B 2006/12097* (2013.01); *G02B 2006/12107* (2013.01); *G02B 2006/12109* (2013.01)

(56) References Cited

U.S. PATENT DOCUMENTS 9,823,418 B2 * 11/2017 Okayama .............. G02B 6/1228
2002/0044743 A1    4/2002 Takeuchi et al.

OTHER PUBLICATIONS

Simard, Alexandre D., et al., "Bandpass integrated Bragg gratings in silicon-on-insulator with well-controlled amplitude and phase responses", Optics Letters, vol. 40, No. 5, Mar. 1, 2015, 4 pages.

Wang, Junjia et al., "Bandpass Bragg Grating Transmission Filter on Silicon-on-Insulator", IEEE 11th International Conference on Group IV Photonics (GFP), Aug. 27-29, 2014, 2 pages.

Wang, Xiong et al., "High power, widely tunable, narrowband superflourescent source at 2 um based on a monolithic Tm-doped fiber amplifier", Optical Society of America, Feb. 4, 2015, 8 pages.

Zhang, K., et al., "Wide-stopband chirped fibre moire grating transmission filters", Electronics Letters, vol. 31, No. 6, Mar. 16, 1995, 4 pages.

Wang, Junjia et al., "Integrated bandpass transmission filters based on Sagnac loops incorporating Bragg gratings in SOI", IEEE 12th International Conference on Group IV Photonics (GFP), Aug. 26-28, 2015, 2 pages.

* cited by examiner

US 11,320,586 B2

BANDPASS TRANSMISSION FILTER AND NARROWBAND RADIATION SOURCE

This application claims the benefit of European Patent Application No. 19161714, filed on Mar. 8, 2019, which application is hereby incorporated herein by reference in its entirety.

TECHNICAL FIELD

Embodiments relate in general to the field of optical devices and, more specifically, to a bandpass transmission filter and narrowband radiation source.

BACKGROUND

Narrowband radiation sources are needed for various applications, e.g., optical sensors in the field of optical absorption sensor applications. For optical sensing, the mid-infrared region from about 2 to 20 µm is, for example, interesting as many environmental gasses have a unique fingerprint in this wavelength region, which allows developing a selective absorption sensor and minimize cross sensitivities.

However, currently used radiation sources need to be tailored to the specific application, e.g., for mid-infrared emitter applications. Therefore, there is a need in the art for an approach to implement a bandpass transmission filter (=bandpass filter) offering a combination of a narrow transmission band and a spectrally broad stop-band, and providing a relatively low complexity of structural filter design resulting in an inexpensive filter fabrication and radiation source fabrication.

SUMMARY

According to an aspect, a bandpass transmission filter having a center wavelength $\lambda_o$ of transmission comprises: a waveguide structure, a grating structure in the waveguide structure, the grating structure having changing grating pitch values $\Lambda_i$ for diffracting a radiation in the waveguide structure having a wavelength $\lambda_1$ which is lower than the center wavelength $\lambda_o$ ($\lambda_1 < \lambda_o$), and for reflecting, e.g. a Bragg reflection, a radiation in the waveguide structure having a wavelength $\lambda_2$ which is higher than the center wavelength $\lambda_o$ ($\lambda_2 > \lambda_o$), and a radiation absorbing structure, which is an integrated part of the waveguide structure or is formed as a layer arranged adjacent to the waveguide structure, for absorbing a radiation guided by the waveguide structure having a wavelength $\lambda_3$ higher than the wavelength $\lambda_2$, with $\lambda_o < \lambda_2 < \lambda_3$.

Using the bandpass transmission filter having a spectrally broad stop-band with a narrow transmission band at the center wavelength $\lambda_o$ of transmission in combination with a broad-band emitter, e.g., a thermal emitter, allows creating a narrowband radiation source. The filtered radiation which is transmitted through the bandpass transmission filter can be coupled, for example, into any kind of waveguides, e.g., a slab waveguide, a strip waveguide, a photonic crystal waveguide, etc., which can be used as sensor element for sensing the presence of a target gas in the environment of the waveguide.

BRIEF DESCRIPTION OF THE DRAWINGS

Embodiments of the present bandpass transmission filter and the narrowband radiation source are described herein making reference to the appended drawings and figures.

Before discussing the present embodiments in further detail using the drawings, it is pointed out that in the figures and the specification identical elements and elements having the same functionality and/or the same technical or physical effect are usually provided with the same reference numbers or are identified with the same name, so that the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the present concept, and do not limit the scope of the embodiments. In the following description of embodiments, the same or similar elements having the same function have associated therewith the same reference signs or the same name, and a description of such elements will not be repeated for every embodiment. Moreover, features of the different embodiments described hereinafter may be combined with each other, unless specifically noted otherwise.

It is understood that when an element is referred to as being "connected" or "coupled" to another element, it may be directly connected or coupled to the other element, or intermediate elements may be present. Conversely, when an element is referred to as being "directly" connected or coupled to another element, there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, the figures comprise a Cartesian coordinate system x, y, z, wherein the x-y-plane corresponds, i.e. is parallel, to the first main surface region of a substrate, and wherein the depth direction vertical to the first main surface region and into the substrate corresponds to the "z" direction, i.e. is parallel to the z direction. In the following description, the term "lateral" means a direction parallel to the x-direction, wherein the term "vertical" means a direction parallel to the z-direction.

Various embodiments relate to the field of a bandpass transmission filter having a center wavelength λo of transmission. Some embodiments are directed to a tuned bandpass transmission filter with large rejection bandwidth and/or are directed to a narrowband radiation source having a broadband radiation source and the bandpass transmission filter.

Figure 1A:
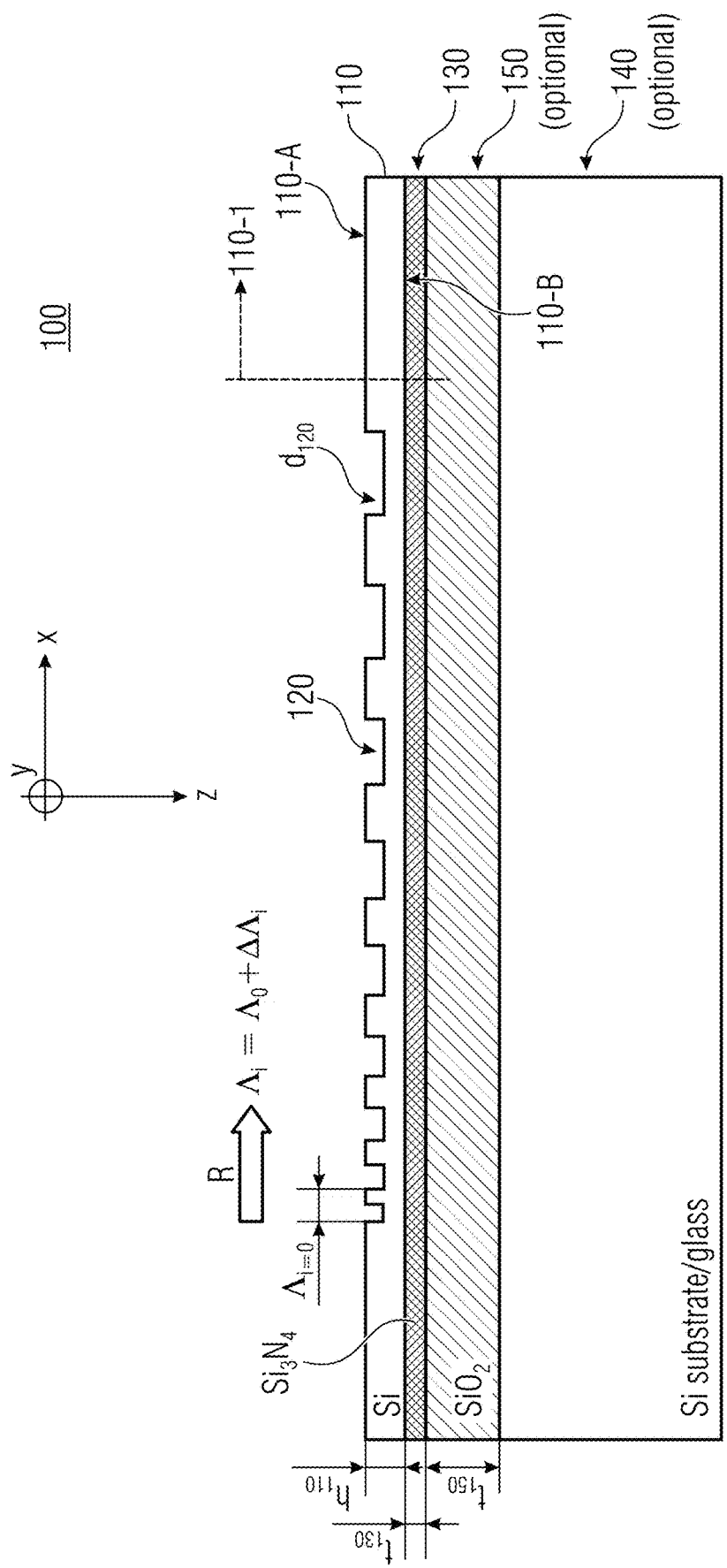
FIG. 1A shows a schematic cross-sectional view of a bandpass transmission filter according to an embodiment.

FIG. 1A shows a schematic cross-sectional view of bandpass transmission filter 100 having a center wavelength λo of transmission according to an embodiment.

As shown in FIG. 1A, the bandpass transmission filter (=bandpass filter) 100 having a center wavelength $\lambda_o$ of transmission comprises a waveguide structure 110, a grating structure 120 in the waveguide structure 110, and a radiation absorbing structure 130. The grating structure 120 has changing grating pitch values $\Lambda_i$ for diffracting a radiation "R" propagating in the waveguide structure 110 having a wavelength $\lambda_1$ which is lower than the center wavelength $\lambda_o$, with $\lambda_1 < \lambda_o$, and for reflecting, e.g., by means of a Bragg reflection, a radiation R in the waveguide structure 110 having a further wavelength $\lambda_2$ which is higher than the center wavelengths $\lambda_o$, with $\lambda_2 > \lambda_o$.

As shown in FIG. 1A, the grating structure 120 may be formed in a first main surface region (or front face) 110-A of the waveguide structure 110. According to an embodiment, the grating structure 120 may be formed in at least one of the faces 110-A-110-D of the waveguide structure 110, wherein the top and bottom faces 110-A and 110-B of the waveguide structure 110 are vertically opposing to each other (see FIG. 1A), and wherein the side faces (=sidewalls) 110-C and 110-D of the waveguide structure 110 are laterally opposing to each other (see FIG. 2B, for example).

The radiation absorbing structure 130 may be an integrated part of the waveguide structure 110 or is formed as a layer, e.g., a dielectric layer, arranged adjacent to the waveguide structure 110, for absorbing a radiation R guided by the waveguide structure 110 having a wavelength $\lambda_3$ higher than the wavelength $\lambda_2$, with $\lambda_o < \lambda_2 < \lambda_3$.

According to an embodiment, the waveguide structure 110 may be optionally arranged on a substrate 140, e.g., a semiconductor substrate, such as a silicon substrate, or a glass substrate, as exemplarily shown in FIG. 1A.

According to an embodiment, the change in grating pitch values $\Lambda_i$ depends on the index i according to at least one of a linear function, an exponential function, a polynomial function or a combination thereof. For example, the changing grating pitch values $\Lambda_i$ may be defined as a combination, e.g. a sum or a product, of a basis pitch value $\Lambda_o$ and an variable pitch value $\Delta\Lambda_i$, wherein the variable pitch value $\Delta\Lambda_i$ is at least one of linearly changing, exponentially changing and polynomially changing with "i" or a combination thereof, with $\Lambda_i = \Lambda(i)$.

According to an embodiment, the grating structure 120 may be formed as a "chirped" grating structure having monotonically changing (e.g., increasing or decreasing) grating pitch values $\Lambda_i$.

According to an embodiment, the radiation absorbing structure 130 at least partially covers at least one face, i.e. at least one of the side faces 110-C, 110-D (not shown in FIG. 1A), the bottom face 110-B and/or the top face 110-A of the waveguide structure 110. As exemplarily shown in the embodiment of FIG. 1A, the radiation absorbing structure 130 covers the second main surface region (=bottom face) 110-B of the waveguide structure 110.

Figure 1B:
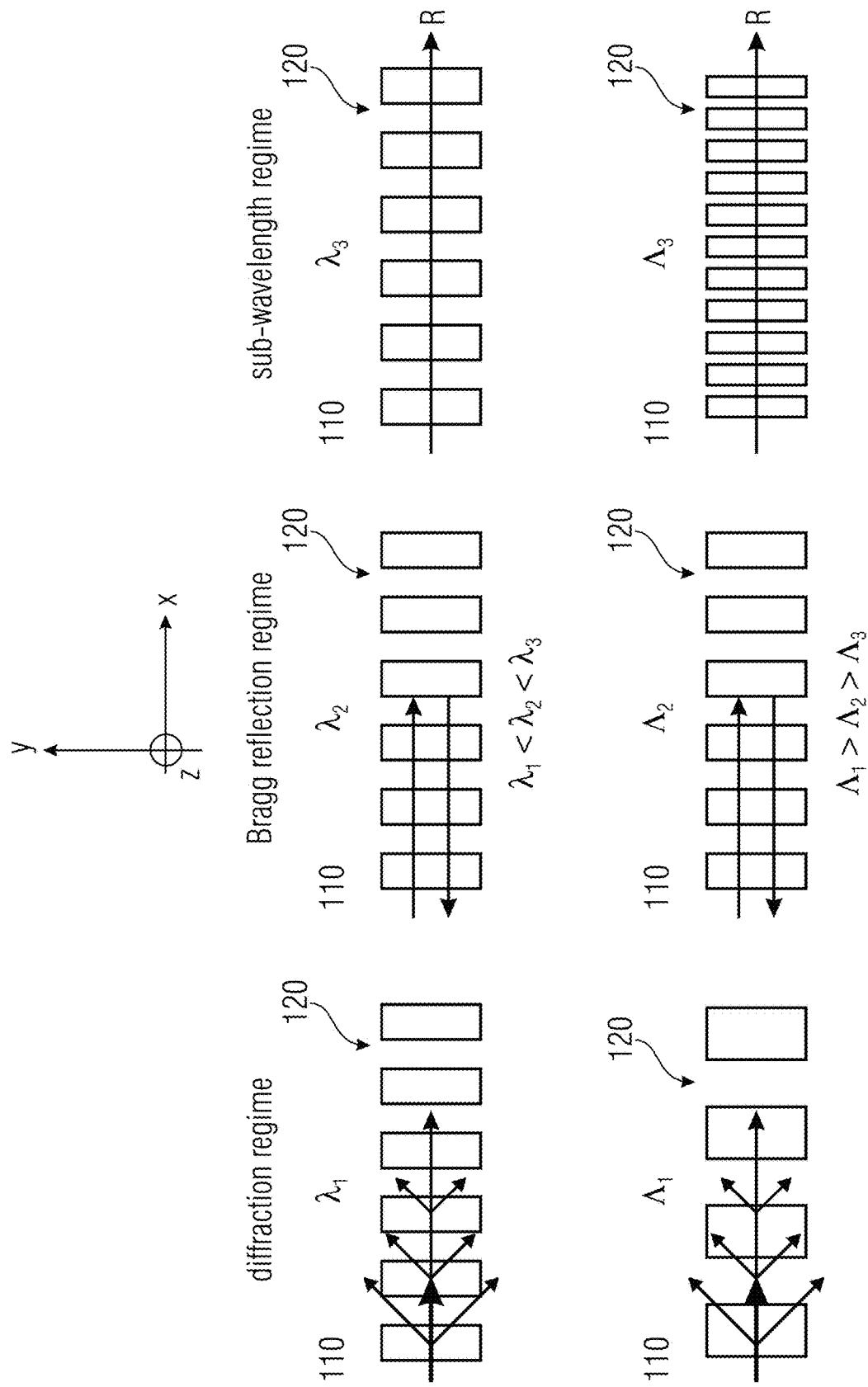
FIG. 1B shows a schematic representation of a diffraction regime, a Bragg reflection regime and a sub-wavelength regime of the bandpass transmission filter according to an embodiment.
Figure 1C:
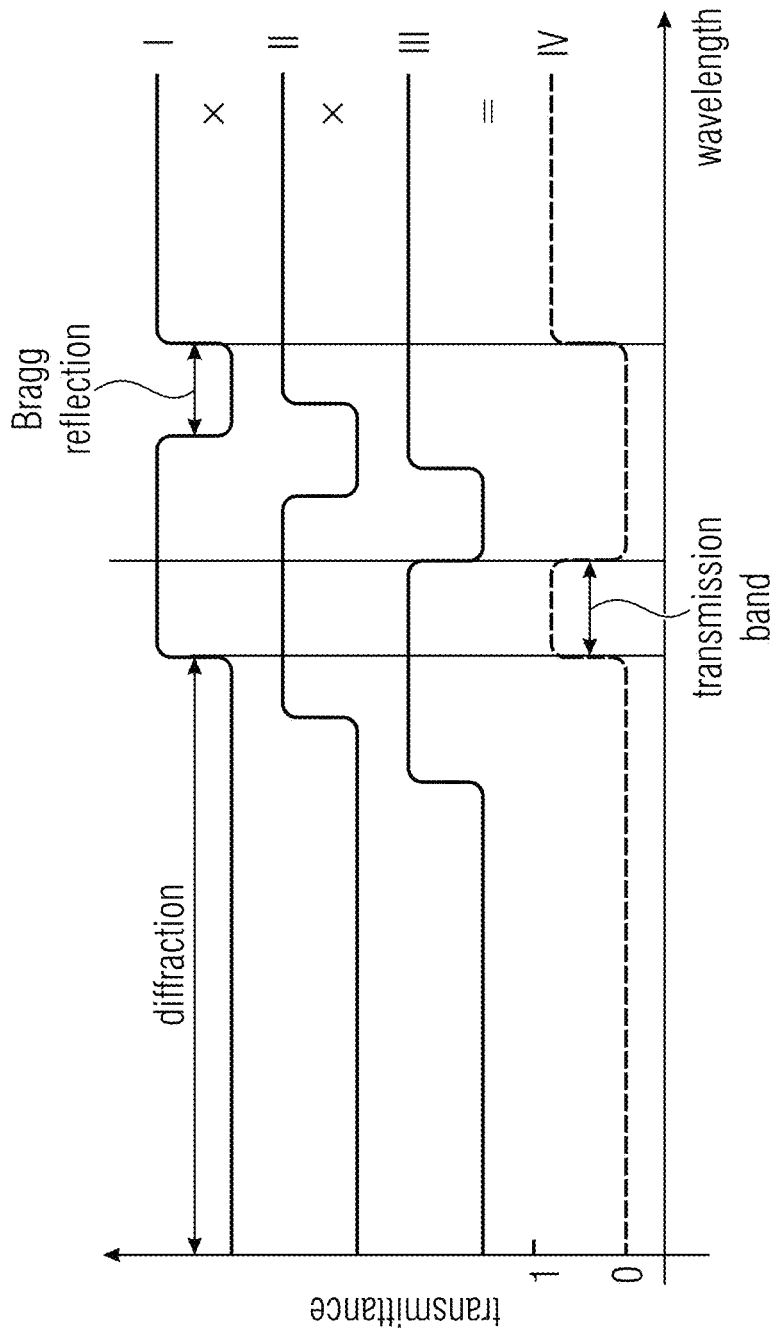
FIG. 1C shows a schematic plot of a combination of different Bragg gratings for providing a narrow transmission window between the diffraction regime and Bragg reflection regime.

With respect to FIGS. 1B-1C, the following description provides a summary of the physical characteristics for designing the bandpass transmission filter 100 having the center wavelength $\lambda_o$ of transmission. To be more specific, FIG. 1B shows a schematic exemplarily representation of the diffraction regime, the Bragg reflection regime and sub-wavelength regime. It is to be noted that the regimes are depicted in FIG. 1B for a constant periodicity of the grating structure 120 (top) and for a constant wavelength (bottom).

In general, depending on the center wavelength λO of transmission of the bandpass transmission filter 100 and the pitch $\Lambda_i$ of the grating structure 120, the radiation R can either be diffracted out of the waveguide 110 (=radiation regime), reflected back within the waveguide (=Bragg reflection regime) or not being influenced at all, e.g. influenced only in terms of the propagation constant (sub-wavelength regime), as shown in FIG. 1B. The transmission band is formed in the transmission window between the diffraction and Bragg reflection regime.

As a Bragg grating would lead to a narrowband rejection filter at the design wavelength $\lambda_o$ (center wavelength), the bandpass transmission filter 100 comprises the waveguide structure 110 with the grating structure 120 with changing grating pitch values $\Lambda_i$, in the waveguide structure 110, e.g., a chirped grating structure, in order to widen the diffraction regime and the reflection regime, i.e., in order to broaden the stop band of the resulting bandpass transmission filter 100. At the same time the transmission window between the diffraction and Bragg reflection regime is narrowed, leading to a narrow transmission band. However, this approach on its own is limited, because the parts of the grating structure 120 with large grating constants will cause short wavelengths $\lambda_1$ of the guided radiation R to be diffracted out. At a certain point, this would also lead to a diffraction of the desired transmission wavelength $\lambda_o$. Thus, the Bragg reflection regime cannot extend over the whole wavelength spectral range. Therefore, the combination of a grating structure having changing grating pitch values $\Lambda_i$, e.g., a chirped grating structure, with a material absorption provided by the radiation absorbing structure 130 is proposed according to an embodiment. The resulting filter structure allows suppressing long wavelengths by tuning the waveguide dimensions and by choosing materials with optical parameters that meet the needs of the design. In total, the bandpass transmission filter 100 combines three physical effects in form of diffraction, Bragg reflection and absorption.

To summarize, the bandpass transmission filter 100 uses diffraction to filter small wavelength $\lambda_1$ of the guided radiation R, i.e. with $\lambda_1 < \lambda_o$, uses Bragg reflection to filter wavelength $\lambda_2$ of the propagating radiation R longer than the desired wavelength (=center wavelength $\lambda_o$) with $\lambda_2 > \lambda_o$. As the Bragg reflection regime cannot be arbitrarily extended, since at a certain point, it would lead to a diffraction of the desired wavelength $\lambda_o$, an absorption (=absorbing layer 130) is used for filtering long wavelength $\lambda_3$, with $\lambda_o < \lambda_2 < \lambda_3$, in the sub-wavelength regime.

FIG. 1C shows a schematic plot of a combination of different Bragg gratings for providing a narrow transmission window between the diffraction and Bragg reflection regime. The illustration shows on how the narrow transmission band can be created with a chirped grating. For this illustration three different Bragg gratings I, II, III are combined, in order to narrow down the transmission window between the diffraction and Bragg reflection regime. The combination of all three gratings yields the combined characteristics shown in course IV with a thermal emitter, for example.

Figure 1D:
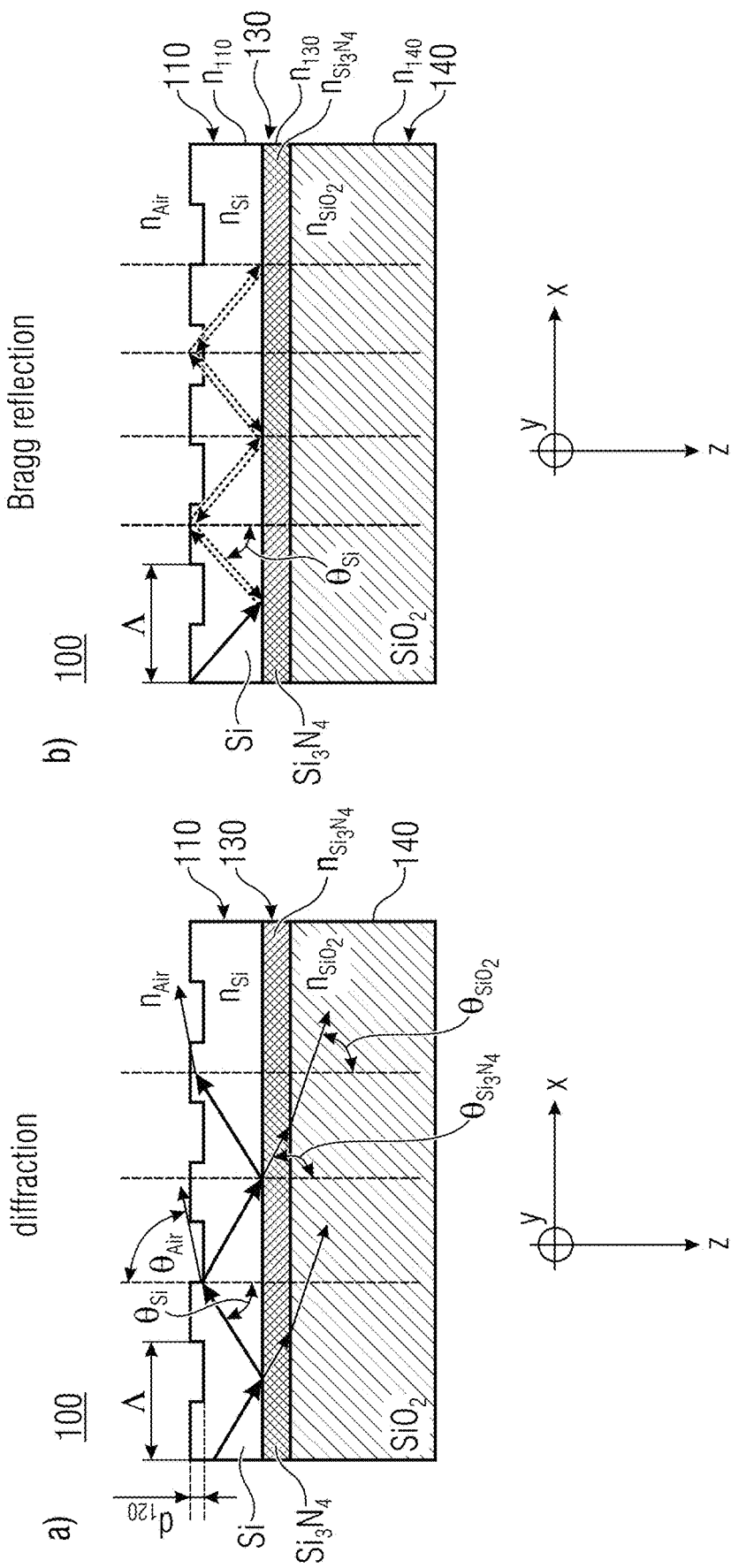
FIG. 1D shows a schematic cross-sectional view of a grating on top of a considered waveguide platform for illustrating a diffraction of short wavelengths (left) and a reflection of long wavelength (right).

FIG. 1D shows a schematic cross-sectional view (parallel to the x-z-plane) of the grating structure 120 on top of a considered waveguide platform, i.e. the waveguide structure 110, for illustrating a diffraction of short wavelengths (left figure) and a reflection of long wavelengths (right figure) according to an embodiment.

Referring to FIG. 1D, two physical effects in form of the Bragg reflections and the diffraction induced by the grating structure 120 are described in the context of guided modes within the dielectric waveguide 110. Thereafter, the grating structure 120 having the changing grating pitch values $\Lambda_i$ is described in detail together with simulation plots showing different filter characteristics of the bandpass transmission filter 100 for specific implementations.

Diffraction/Bragg reflection at the grating structure: The grating structure is based on a modulation of the refractive index, e.g., based on a periodical modulation, an aperiodic modulation and/or monotonically varying (increasing or decreasing) modulation of the refractive index $n_{110}$. Such a modulation of the refractive index n110 of the grating structure 120 can be achieved, for example, by modifying the optical material properties of the waveguide structure 110 or by modifying the geometry of the waveguide structure 110, e.g., by a modification of the height and/or the width of the waveguide structure 110, which also leads to a modification, e.g., a periodic or aperiodic modification, of the effective mode index of the propagating wave $n_{eff(110)}$ and the resulting grating characteristics of the grating structure 120 in the waveguide structure 110.

FIG. 1D depicts the wave vectors of a mode propagating in a waveguide 110 with a grating structure 120 on top, for small wavelengths (a) and for the Bragg-wavelength (b) of the radiation R. Small wavelengths are diffracted, while the specific wavelength, where the Bragg condition holds, is reflected. Longer wavelengths $$\left(\frac{\lambda_0}{n_{eff}} >> 2\Lambda\right)$$

ideally just see an effect on their propagation constants, but are not diffracted or reflected at all from the grating.

Diffraction: The grating equation for a periodic structure can be written as:

$$\sin\theta_2 - \sin\theta_{1_m} = \frac{m \cdot \lambda}{\Lambda} \quad (1)$$

where $\theta_2$, is the incoming angle, $\theta_{1_m}$ the diffracted angle for the order m,$\lambda$ is the wavelength in the material and $\Lambda$ is the pitch of the grating.

In the considered case, the grating is formed on a material interface ($n_{Air}$ and $n_{110} = n_{Si}$). For convenience, here $n_i$ is assumed to be purely real. Therefore the different propagation velocities have to be accounted for by adding the refractive indices of the materials to Equation 1. For diffraction into air (=environment atmosphere), $SiO_2$ (=further dielectric layer 150) and $Si_3N_4$ (=dielectric layer 130), respectively, this leads to:

$$n_{Si} \cdot \sin\theta_{Si} - n_{Air} \cdot \sin\theta_{Air_m} = \frac{m \cdot \lambda_0}{\Lambda} \quad (2)$$

$$n_{Si} \cdot \sin\theta_{Si} - n_{SiO2} \cdot \sin\theta_{SiO2_m} = \frac{m \cdot \lambda_0}{\Lambda},$$

the angle of the wave vector of a waveguide mode can be calculated using $$\sin\theta_{Si} = \frac{n_{eff}}{n_{Si}}. \quad (3)$$

where $n_{eff}$ is the effective index of the waveguide mode. Inserting (3) into (2) leads to the angle at which the radiation R is reflected out of the waveguide 110:

$$\theta_{Air} = a\sin\left(\frac{n_{eff}}{n_{Air}} - \frac{m \cdot \lambda_0}{\Lambda \cdot n_{Air}}\right) \quad (4)$$

$$\theta_{SiO2} = a\sin\left(\frac{n_{eff}}{n_{SiO2}} - \frac{m \cdot \lambda_0}{\Lambda \cdot n_{SiO2}}\right).$$

Bragg reflection: A special case is the Bragg reflection, where the radiation R is reflected on the periodic structure 120 (see also FIG. 1D-right). Starting again from Equation 1, this reflection occurs if sin $\theta_1 = -$ sin $\theta_2$. Inserting this condition into Equation 1 and using m=1, leads to $$2 \cdot \sin\theta_2 = \frac{\lambda_0}{n_{Si}\Lambda} \rightarrow 2 \cdot \frac{n_{eff}}{n_{Si}} = \frac{\lambda_0}{n_{Si}\Lambda} \rightarrow \quad (5)$$

$$\lambda_0 = 2 \cdot n_{eff} \cdot \Lambda$$

for the waveguide grating 120. The result is the condition for Bragg reflection in the grating 120.

Changing (Chirped) Grating Filter: The two effects described above are used to form a narrow transmission band. The Bragg reflection is a narrow band effect, i.e. a grating with a single pitch would only reflect a narrow band. In order to make this band wider, the grating pitch is changed, e.g. continuously increased (chirped), which leads to a broadening of the reflection band, which can therefore be used to narrow the transmission window between the diffraction and Bragg reflection regime.

For simplicity, in this section the chirped grating filter 100 realization is described for a slab waveguide 110. Analogously, the bandpass transmission filter 100 can also be realized on different kinds of waveguides. FIG. 1A shows a schematic representation of the waveguide structure 110 with the chirped grating 120. The grating structure 110 can be realized on a silicon or on insulator (dielectric) platform.

The changing grating pitch values $\Lambda_i$ depend on at least one of a linear function, an exponential function and a polynomial function, wherein the changing grating pitch values $\Lambda_i$ may comprise a combination of a basis pitch value "$\Lambda_o$" and a variable pitch value $\Delta\Lambda_i$, wherein the variable pitch value is linearly changing, exponentially changing and/or polynomially changing with "i". According to an embodiment, the grating structure 120 may be a chirped grating structure having monotonically changing, i.e. increasing or decreasing, grating pitch values $\Lambda_i$.

The changing grating pitch values $\Lambda_i$ may be calculated using $$\Lambda_i = \Lambda(i), \quad (6)$$

wherein the changing grating pitch values $\Lambda_i$ may be defined as a combination, e.g. a sum or a product, of a basis pitch value $\Lambda_0$ and a variable pitch value $_\Delta\Lambda_i$, wherein the variable pitch value $_\Delta\Lambda_i$ is at least one of linearly changing, exponentially changing and polynomially changing with "I" or a combination thereof.

The first or basis pitch of the grating structure 120 may be therefore defined as $\Lambda_0 = \Lambda_{center} + \Lambda_{Gap}$. The center pitch $\Lambda_{center}$ is calculated using a rearranged form of the Bragg condition (5), where $\Lambda_0$ is the vacuum wavelength at which high transmission is desired (center wavelength $\lambda_o$) and $n_{eff}$ the effective mode index. In order to avoid Bragg reflections at the center wavelength $\lambda_o$, the pitch of $\Lambda_0$ is increased by a gap=$\Lambda_{Gap}$. The pitch of the higher number periods are calculated based on the variable pitch value $\Delta\Lambda_i$.

To summarize, the basis pitch value "$\Lambda_0$" comprises a center pitch value "$\Lambda_{Center}$" and an additional gap value "$\Lambda_{Gap}$", to avoid Bragg reflection at the center wavelength $\lambda_o$, wherein the term "$\Lambda_{Center}$" depends on the function:

$$\Lambda_{Center} = \frac{\lambda m}{2n_{eff}},$$

wherein $\lambda_o$ is the center wavelength of transmission, $n_{eff}$ is the effective mode index of the mode that propagates in the waveguide structure 110, and m is the diffraction order.

In order to comply with industrial design rules (e.g., 1 nm grid), the continuous grating period change $\Delta\Lambda_i$ can be discretized to a minimum of e.g., 1 nm for lines and spaces (depending on the design rules). This can raise the need to repeat each individual grating period for a few times, before increasing the pitch $\Lambda_i$, in order to achieve a sufficient stop-characteristic. Thus, the i-th grating pitch value $\Lambda_i$ may be repeated N-times with N=2, 3, 4, 5, 6, 7, 8, . . . or at least 4 times with N≥4.

According to an embodiment, the changing grating pitch values $\Lambda_i$ may depend on a linear (e.g., increasing) function with $\Lambda_i = \Lambda_0 + \Delta\Lambda \times i$, wherein "$\Lambda_0$" is the basis pitch value and "$\Delta\Lambda \times i$" is the variable pitch value. The center pitch "$\Lambda_{Center}$" is 753 nm or between 700-800 nm, for example, the gap "$\Lambda_{Gap}$" is 18 nm or between 15-21 nm, for example, the increment or variation for the pitches $\Delta\Lambda$ is 2 nm or between 1.5-2.5 nm, for example, and the number of periods i is 120 or between 80-160, for example for achieving an exemplary center wavelength $\lambda_o$ of transmission with $\lambda_o$=4.26 µm or between 4.1 and 4.4 µm, for example.

According to an embodiment, the changing grating pitch values $\Lambda_i$ may depend on a linear (decreasing) function with $\Lambda_i = \Lambda_0 + \Delta\Lambda \times (N-i)$, wherein "$\Lambda_0$" is the basis pitch value and "$\Delta\Lambda \times (N-i)$" is the variable pitch value. The center pitch "$\Lambda_{Center}$" is 753 nm or between 700-800 nm, for example, the gap "$\Lambda_{Gap}$" is 18 nm or between 15-21 nm, for example, the increment or variation for the pitches $\Delta\Lambda$ is 2 nm or between 1.5-2.5 nm, for example, and the number of periods i is 120 or between 80-160, for example, for achieving an exemplary center wavelength $\lambda_o$ of transmission with $\lambda_o$=4.26 µm or between 4.1 and 4.4 µm, for example.

According to an embodiment, the changing grating pitch values $\Lambda_i$ may depend on an exponential function with $\Lambda_i = \Lambda_0 + (F_1)^i$, wherein "$\Lambda_0$" is the basis pitch value and "$F_1$" is the variable pitch value. The center pitch "$\Lambda_{Center}$" is 753 nm or between 700-800 nm, for example, the gap "$\Lambda_{Gap}$" is 18 nm or between 15-21 nm, for example, and the variation for the pitches $F_1$=1.05 or between 1.2 and 1,001, for example, and the number of periods i is 120 or between 80-160, for example, for achieving an exemplary center wavelength $\lambda_o$ of transmission with $\lambda_o$=4.26 µm or between 4.1 and 4.4 µm, for example.

According to an embodiment, the changing grating pitch values $\Lambda_i$ may depend on an exponential function with $\Lambda_i = \Lambda_0 \times (F_2)^i$, wherein "$\Lambda_0$" is the basis pitch value and "$F_2$" is the variable pitch value. The center pitch "$\Lambda_{Center}$" is 753 nm or between 700-800 nm, for example, the gap "$\Lambda_{Gap}$" is 18 nm or between 15-21 nm, for example, and the variation for the pitches $F_2$=1.003 or between 1.03 and 1,0003, for example, and the number of periods i is 120 or between 80-160, for example, for achieving an exemplary center wavelength $\lambda_o$ of transmission with $\lambda_o$=4.26 µm or between 4.1 and 4.4 µm, for example.

According to an embodiment, the changing grating pitch values $\Lambda_i$ may depend on an polynomial function with $\Lambda_i = \Lambda_0 + \sum_{k=1}^{n} \Lambda_k i^k$, wherein "$\Lambda_0$" is the basis pitch value and "$\sum_{k=1}^{n} \Lambda_k i^k$" is the variable pitch value. Thus, an exemplary polynomial function third order, with n=3, would results in:

$$\Lambda_i = \Lambda_0 + A \times i + B \times i^2 + C \times i^3.$$

According to a further exemplary embodiment, the constants A, B, C may comprise the values A=12.4625 nm, B=0.25594 nm, C=0.00141 nm, e.g. within a tolerance range of the associated $\Lambda_i$ of ±5% (or ±2%), for achieving an exemplary center wavelength $\lambda_o$ of transmission with $\lambda_o$=4.26 µm or between 4.1 and 4.4 µm, for example. The center pitch "$\Lambda_{Center}$" is 753 nm or between 700-800 nm, for example, the gap "$\Lambda_{Gap}$" is 18 nm or between 15-21 nm, for example, and the number of periods i is 120 or between 80-160, for example, for achieving an exemplary center wavelength $\Lambda_o$ of transmission with $\Lambda_o$=4.26 µm or between 4.1 and 4.4 µm, for example.

According to an embodiment, the radiation absorbing structure 130 at least partially covers at least one of a side face (or both side faces), a bottom face and a top face of the waveguide structure 110 having the grating structure 120.

According to a further embodiment, the waveguide structure 110 may arranged on a substrate 140, wherein a dielectric layer 130, which forms the radiation absorbing structure 130, and a further dielectric layer 150 are arranged between the waveguide structure 110 and the substrate 140. The further dielectric layer 150 is formed between the dielectric layer 130 and the substrate 140.

According to a further embodiment, the further dielectric layer 150 is formed between the waveguide structure 110 and the substrate 140, wherein the further dielectric layer 150 has a material thickness for suppressing a coupling of the waveguide mode from the waveguide structure 110 into the substrate 140.

According to an embodiment, the dielectric layer (=absorbing layer) 130 may comprise at least one of a $Si_3N_4$, $SiO_2$ and $Al_2O_3$ material. The further dielectric layer (=lower cladding) 150 may comprise at least one of a $SiO_2$, Si, $Al_2O_3$ and $Si_3N_4$ material. The waveguide structure 110 may comprise at least one of a (poly) silicon (Poly-Si), Si, Ge, $Si_3N_4$, AlN and $As_2Se_3$ material. The substrate 140 may comprise at least one of Si and glass material.

According to a further embodiment, the waveguide structure 110 may comprise a semiconductor material, e.g. a (poly) silicon material, or a dielectric material.

A specific example for such a platform, which was also used for the simulations below, a $SiO_2$ layer 150 ($\geq 2$ μm) may be deposited on a Si substrate 140 in order to suppress coupling of the waveguide mode into the substrate 140. On top of the $SiO_2$ layer 150, a thin $Si_3N_4$ (e.g., 140 nm) 130 is used as absorbing layer for long wavelengths. The waveguide 110 on top may be made of silicon with a height of e.g., 660 nm. Eventually the grating 120 is etched into the top of the silicon waveguide 110. FIG. 1A shows a schematic representation of the described platform.

According to a further embodiment, the waveguide structure 110 may comprise a waveguide extension structure 110-1, wherein the radiation absorbing layer 130 at least partially covers a face of the waveguide extension structure 110-1 for reducing a sideband transmission of the bandpass transmission filter 100.

The bandpass transmission filter 100 may be used in combination with a broadband thermal emitter for providing a narrowband radiation source, which can be employed for various applications, e.g. optical sensors.

The bandpass transmission filter (=narrow-band filter) 100 can be adapted to a specific application (e.g., a $CO_2$ absorption band 4.26 μm and a bandwidth of e.g., 140 nm). The bandpass transmission filter 100 provides a spectrally broad stop-band with a narrow transmission band. The combination of this bandpass transmission filter 100 with a broadband source (e.g., thermal emitter) leads to a narrow band radiation source.

The bandpass transmission filter 100 can be fabricated with low costs. When using a waveguide platform, for some embodiments, the bandpass transmission filter 100 can be fabricated without additional processing steps, which means no extra efforts and costs. To be more specific, the fabrication of such a bandpass transmission filter 100 requires no extra fabrication steps when carried out as sidewall grating 120, or one extra litho/etching process when carried out on top of the waveguide 110. This gives the possibility to easily create a low cost narrow band radiation source using a thermal emitter and the described bandpass transmission filter 100.

A possible application of the bandpass transmission filter 100 may be an optical IR sensor. The bandpass transmission filter 100 can be combined with a thermal emitter in order to create a narrow band radiation source. The filtered radiation which is present at the end of the bandpass transmission filter 100 can be coupled into different kinds of waveguides (e.g., slab, strip, photonic crystals, etc.) which may act as sensor elements.

To summarize, the bandpass transmission filter 100 comprises a waveguide 110 with a changing or chirped grating 120, which is a grating 120 with a variable grating constant. Tailoring this grating and the interaction with the used materials allows creating a narrow transmission band, adapted to the desired wavelength.

The bandpass transmission filter 100 provides a filter concept, which is well suited for optical integrated waveguides. The modulation is most favorably introduced by geometrical variations of the waveguide dimensions and the waveguide design can be tuned to the material characteristics.

According to the present filter concept, a changing or chirped grating 120 is engineered in order to create the transmission band filter 100, which can be used e.g., to create narrow-band IR sources. According to the present filter concept, three physical effects are combined, diffraction, Bragg reflection and absorption, wherein a tailored waveguide structure 110 allows realizing the narrow-band transmission filter 100 with a wide spectral rejection range. The filter 100 can be adapted for various application and fabrication tolerances. This narrow-band transmission filter 100 can be implemented to most waveguide designs, without significant additional fabrication costs. According to the present filter concept Bragg gratings, and also chirped Bragg gratings, may be applied for an effective limitation of a very broad spectral rejection band. According to the present filter concept, a waveguide design and a Bragg-grating design are combined.

Figure 2A:
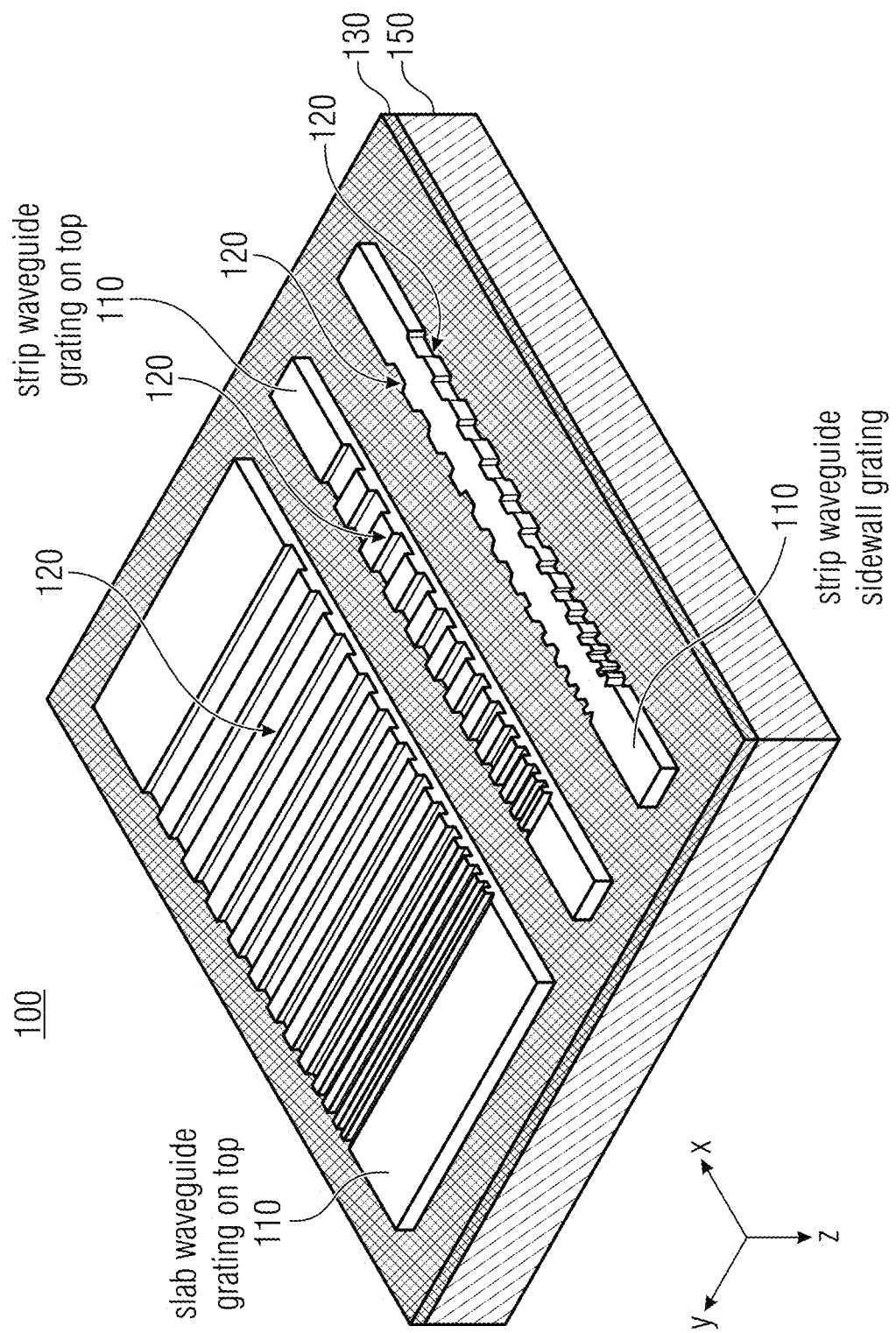
FIG. 2A shows a schematic 3D top view of different schematic representation of chirped gratings on slab and strip waveguides (as different design options) according to an embodiment.

FIG. 2A shows a schematic 3D top view of different schematic representation of changing or chirped gratings 120 on slab and strip waveguides 110 as different design options according to an embodiment. As shown in FIG. 2A (left), the waveguide structure 110 may be implemented as a slab waveguide having a top face grating 120. As shown in FIG. 2A (middle), the waveguide structure 110 may comprises a strip waveguide having a top face grating 120. As shown in FIG. 2A (right), the waveguide structure 110 may comprise a strip waveguide having a side face grating 120.

According to a further embodiment, the waveguide structure may comprise a strip waveguide having a side face grating or having a top face grating (not shown in FIG. 2A). According to a further embodiment, the waveguide structure may comprise a slot waveguide having a side face grating or having a top face grating (not shown in FIG. 2A). According to a further embodiment, the waveguide structure may comprise a strip waveguide having a side face grating or having a top face grating (not shown in FIG. 2A). According to a further embodiment, the waveguide structure may comprise an optical fiber structure (not shown in FIG. 2A).

Figure 2B:
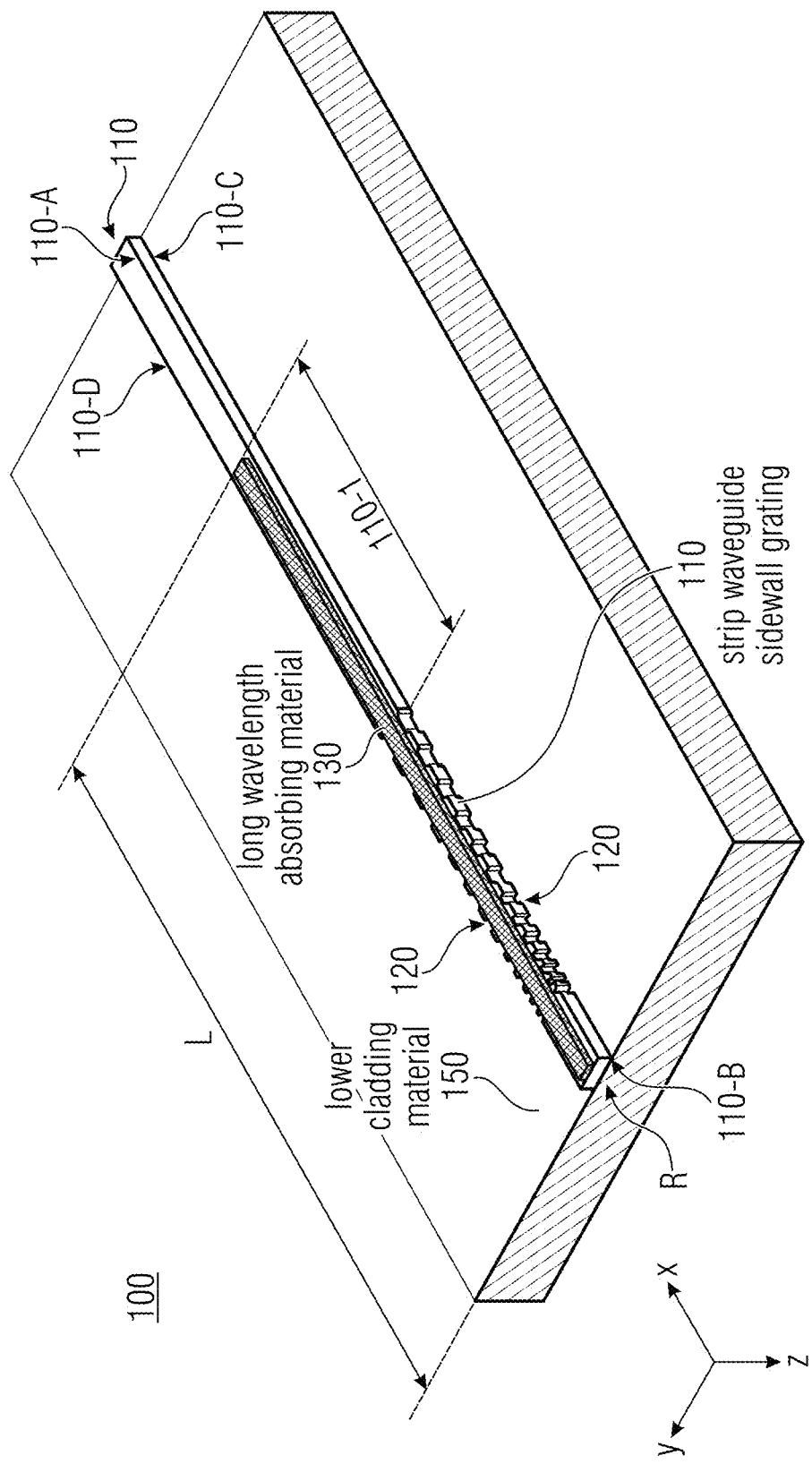
FIG. 2B shows a schematic 3D top view of the bandpass transmission filter with a strip waveguide having a changing or "chirped" grating integrated in the sidewalls and an absorbing layer for wavelengths $>\lambda_3$ on top of the waveguide according to an embodiment.

FIG. 2B shows a schematic 3D top view of the bandpass transmission filter 100 with a strip waveguide 110 having the changing or "chirped" grating structure 120 integrated in the sidewalls 110-C, 110-D of the strip waveguide 110 and an absorbing layer for wavelengths $>\lambda_3$ on top of the waveguide according to an embodiment.

As shown in FIG. 2B, the waveguide structure 110 comprises the waveguide extension structure 110-1, wherein the radiation absorbing layer 130 (at least partially) covers the first main surface region or top face 110-A in FIG. 2B of the waveguide extension structure 110-1 for reducing a sideband transmission of the filter 100. As further shown in FIG. 2B, (at least) the part of the waveguide structure 110 having the grating structure 120 and the waveguide extension structure 110-1 is sandwiched between the radiation absorbing layer 130 (=long wavelength absorbing material) and the further dielectric layer 150 (=lower cladding material).

According to the embodiment of the bandpass transmission filter 100 as shown in FIG. 2B, the long wavelength absorber 130 is placed on top of the waveguide structure 110, which may facilitate the fabrication process.

To summarize, FIG. 2B shows the bandpass transmission filter 100 using a strip waveguide 110, which can be used in order to filter a broadband source, e.g. thermal emitter (not shown in FIG. 2B). Here, the grating structure 120 is realized on the sidewalls 110-C, 110-D of the waveguide structure 110. Besides varying the grating period $\Lambda_i$ for the depicted embodiment, it is also possible to arbitrary vary the depth $d_{120}$ of the grating structure 120 in order to optimize the filter performance. In this realization, the dielectric layer 130 of a long wavelength absorbing material is attached on the top (first main surface region) 110-A of the waveguide structure 110. The length L of this layer can be designed in order to sufficiently suppress the side band transmission at long wavelengths $\lambda_3$. Afterwards the waveguide structure 110 is continued without the absorbing layer 130 on top in order to reduce the intrinsic losses.

In the following, an exemplary numerical investigation of such a grating structure 120 is presented.

According to an embodiment, the bandpass transmission filter 100 was designed for a center wavelength $\lambda_0=4.26$ μm (transmission wavelength $\lambda_o$) and for TE-polarized radiation. The center pitch $\Lambda_{Center}$ was 753 nm (calculated using Equation 5), the Gap ($\Lambda_{Gap}$) was 18 nm and the variation $\Delta\Lambda_i$ was 2 nm. This leads to a variation of 1 nm for lines and spaces. The grating pitch $\Lambda_i$ was increased 120 times (I=120), leading to a maximum pitch of 1011 nm. The height $h_{110}$ of the waveguide was 660 nm and the depth $d_{120}$ of the grating was 100 nm. The thickness $t_{150}$ of the dielectric layer 130, e.g. a $Si_3N_4$ layer, was 140 nm, and below the $Si_3N_4$ layer 130 the further dielectric layer 150, e.g. a $SiO_2$ layer, was considered to be infinite. Due to the 1 nm grid it was necessary to repeat each pitch 4 times, N=4, in order to achieve the band-pass performance as illustrated below. On both ends of the bandpass transmission filter 100, the waveguide structure 110 was elongated (with the waveguide extension structure 110-1) for 5 pm, leading to a total filter length of 437.2 μm.

Figure 3A:
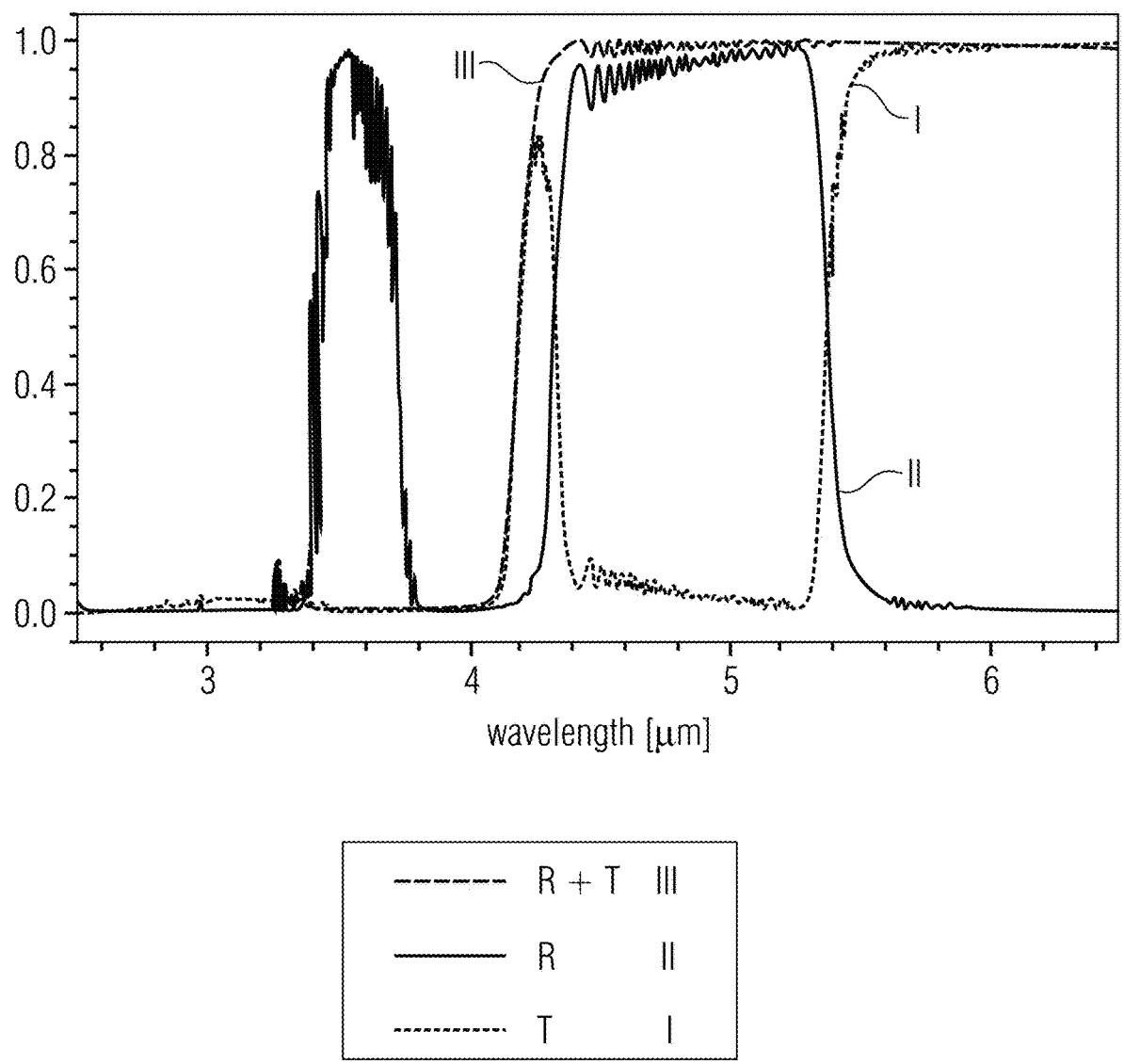
FIG. 3A shows a schematic plot of FEM (FEM=finite element method) simulation results of the transmittance T (curve I), reflection R (curve II) and the transmittance plus reflection T+R (curve III) without taking into account material absorption.

FIG. 3A shows a schematic plot of FEM (FEM=finite element method) simulation results of the transmittance T (curve I), reflection R (curve II) and the transmittance plus reflection T+R (curve III) without taking into account material absorption.

Figure 3B:
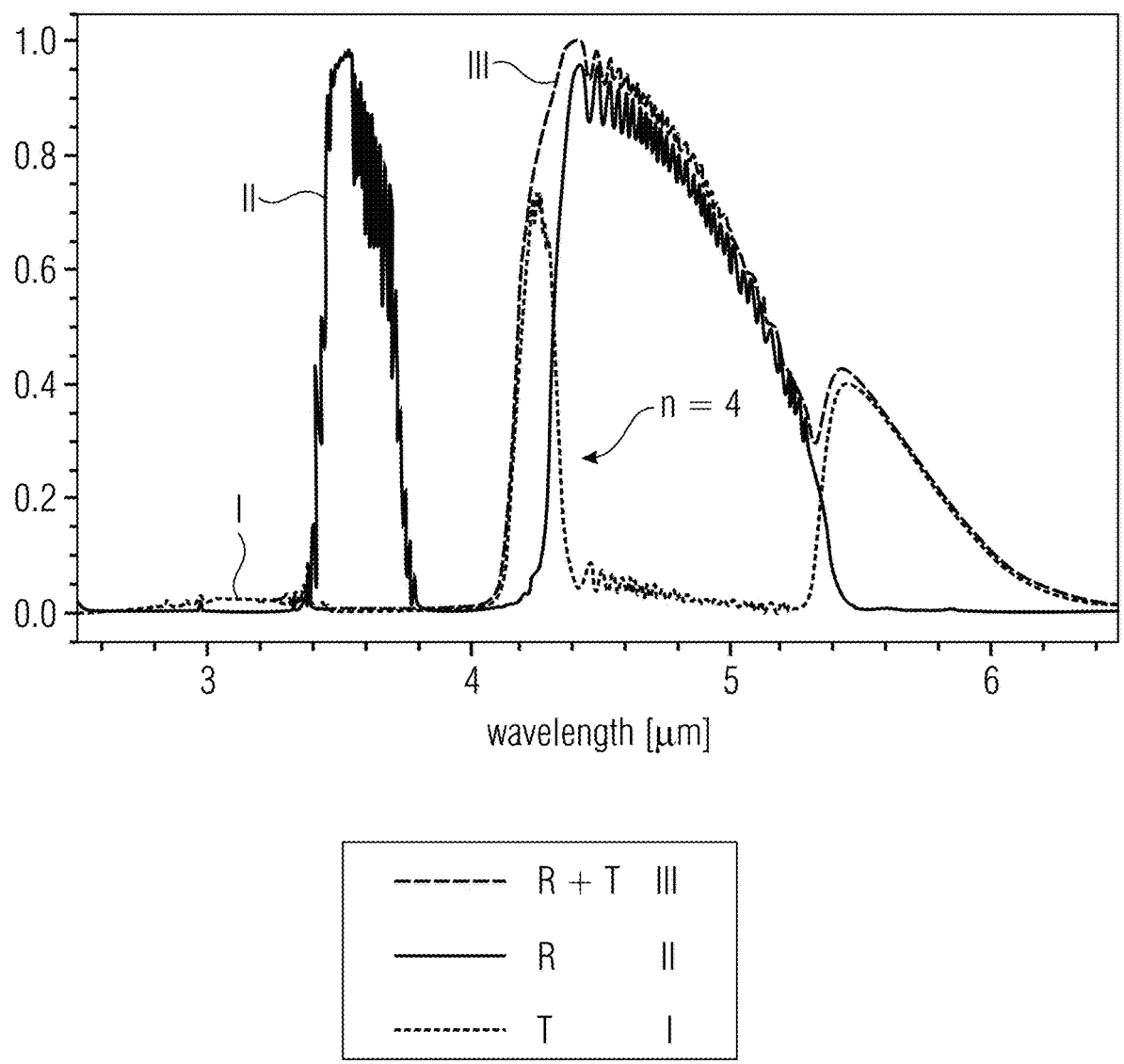
FIG. 3B shows a schematic plot of FEM (FEM=finite element method) simulation results of the transmittance T (curve I), reflection R (curve II) and the transmittance plus reflection T+R (curve III) taking into account material absorption.

FIG. 3B shows a schematic plot of FEM (FEM=finite element method) simulation results of the transmittance T (curve I), reflection R (curve II) and the transmittance plus reflection T+R (curve III) with taking into account material absorption.

Figure 3C:
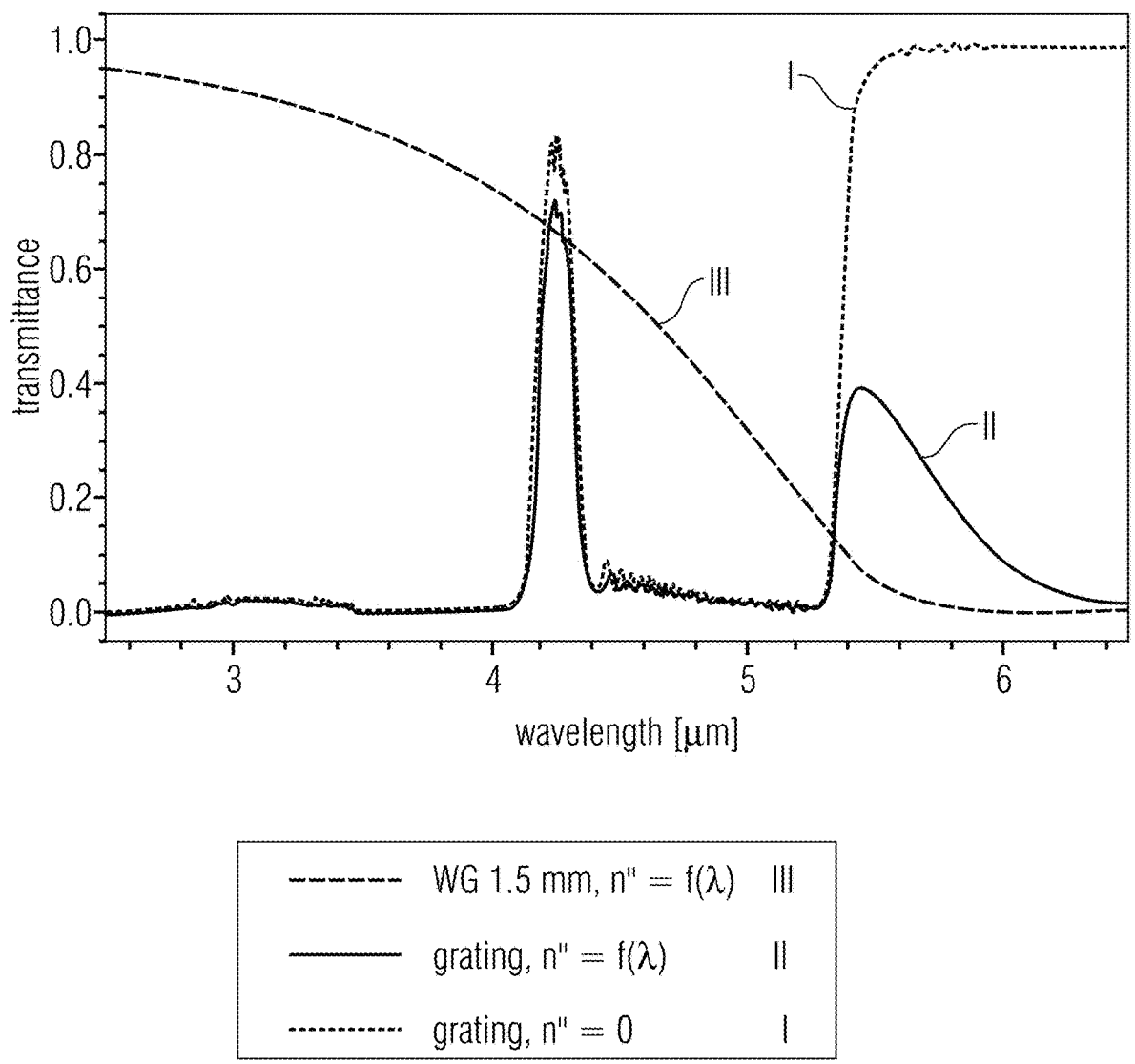
FIG. 3C shows a schematic plot of FEM (FEM=finite element method) simulation results of the transmittances T through the grating filter 100 with material absorption (curve I) and without material absorption (curve II) and the transmittance (curve III) through the waveguide structure 110 in form of a slab waveguide with a length of 1.5 mm and taking into account the material absorption according to an embodiment.

FIG. 3C shows a schematic plot of FEM (FEM=finite element method) simulation results of the transmittances T through the grating filter 100 with material absorption (curve I) and without material absorption (curve II) and the transmittance (curve III) through the waveguide structure 110 in form of a slab waveguide with a length of 1.5 mm and taking into account the material absorption according to an embodiment.

To summarize, FIGS. 3A-3C show FEM simulation results with (a) and without (b) taking into account material absorption, depicting the transmittance and the reflectance as well as the sum of both. Furthermore FIG. 3C shows a comparison of the transmittance through the grating filter with and w/o material absorption, and the transmittance through a plain slab waveguide with a length of 1.5 mm and taken into account the material absorption.

As shown in FIG. 3A (curve I), the filter shows a narrow transmission band at the design wavelength ($\lambda_0=4.26$ μm) while there is almost no transmission for shorter wavelengths due to diffraction. The stop-band from wavelengths ~4.3 μm to ~5.5 μm is due to Bragg reflections in the grating structure 120. Above wavelengths ~5.75 μm the grating structure 120 has no influence on the propagation of the mode in the waveguide structure 110. In the region where the sum of Reflectance and Transmittance R+T (curve III) is smaller than 1, a diffraction occurs.

When taking into account also the intrinsic losses due to material absorption, the transmission at longer wavelengths drastically decreases leading to virtually no transmission at wavelengths >6.5 μm (see FIG. 3B). Nevertheless, there is still a significant side band visible between the wavelengths 5.5 μm and 6 μm.

FIG. 3C shows comparisons of the transmittance T through the waveguide structure with a chirped grating structure 120 without (curve I-n"=0, from FIG. 3A) taking into account material absorption and with (curve II-n"=f(λ), from FIG. 3B) taking into account material absorption, as well as the simulated transmittance of a waveguide without grating and a length of 1.5 mm (curve III-taking into account material absorption). For the sake of completeness, without taking into account the material absorption, the waveguide without grating transmits up to 9.5 μm before strong damping is induced due to leaking of the mode.

Figure 3D:
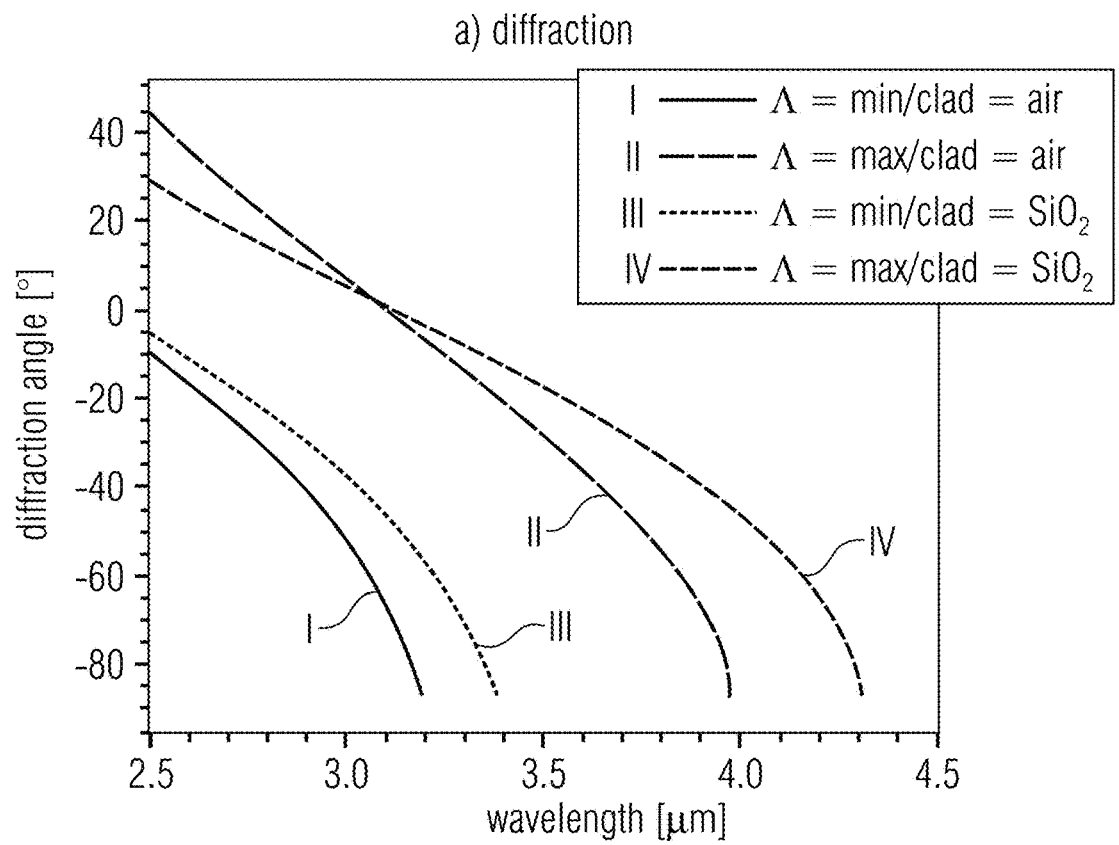
FIGS. 3D-3E show schematic plots of the "diffraction angles" as a function of the wavelength, the grating pitch and the cladding material, and of the "grating pitch", which satisfies the condition for Bragg reflection as a function of the wavelength.
Figure 3E:
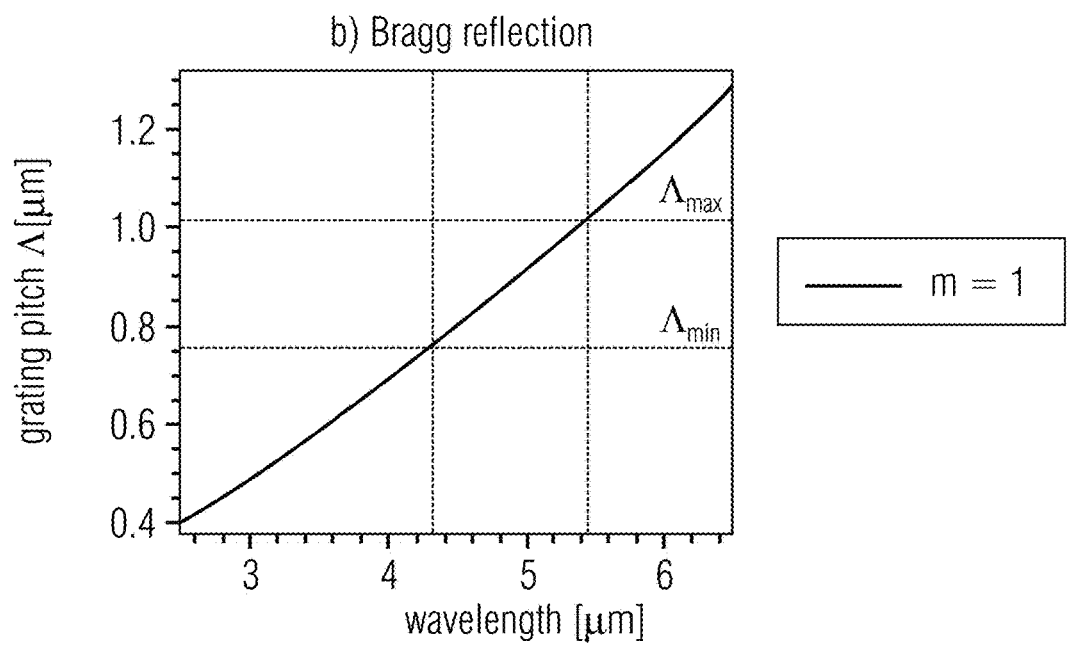

FIGS. 3D-3E show schematic plots of the "diffraction angles" as a function of the wavelength, the grating pitch and the cladding material, and of the "grating pitch", which satisfies the condition for Bragg reflection as a function of the wavelength.

FIG. 3D depicts the diffraction angles calculated according to Equation 4 for the minimum and maximum pitch $\Lambda_i$, for the two dominant cladding materials in form of the environmental atmosphere, e.g. air, and the further dielectric layer 150, e.g. the $SiO_2$ layer. For the maximum pitch the diffraction into the further dielectric layer 150, e.g. the $SiO_2$ layer already reaches the desired transmission wavelength $\lambda_o$, which is also visible in FIG. 3A, since the transmittance plus reflection R+T is not reaching a value of 1. As there are very limited periods with a high pitch, only a small fraction of the radiation R with a wavelength around 4.26 pm is diffracted. Nevertheless, this effect leads to limitations for the stopband of the Bragg reflection.

FIG. 3E shows the grating pitch which satisfies the condition for Bragg reflection as a function of the wavelength. The dashed lines mark the range for which Bragg condition is fulfilled with the used grating pitches (~4.32 μm to 5.28 μm). As shown in FIG. 3A, although the Bragg condition is only satisfied up to 5.28 μm the grating influences the transmission up to ~5.53 μm.

Figure 3F:
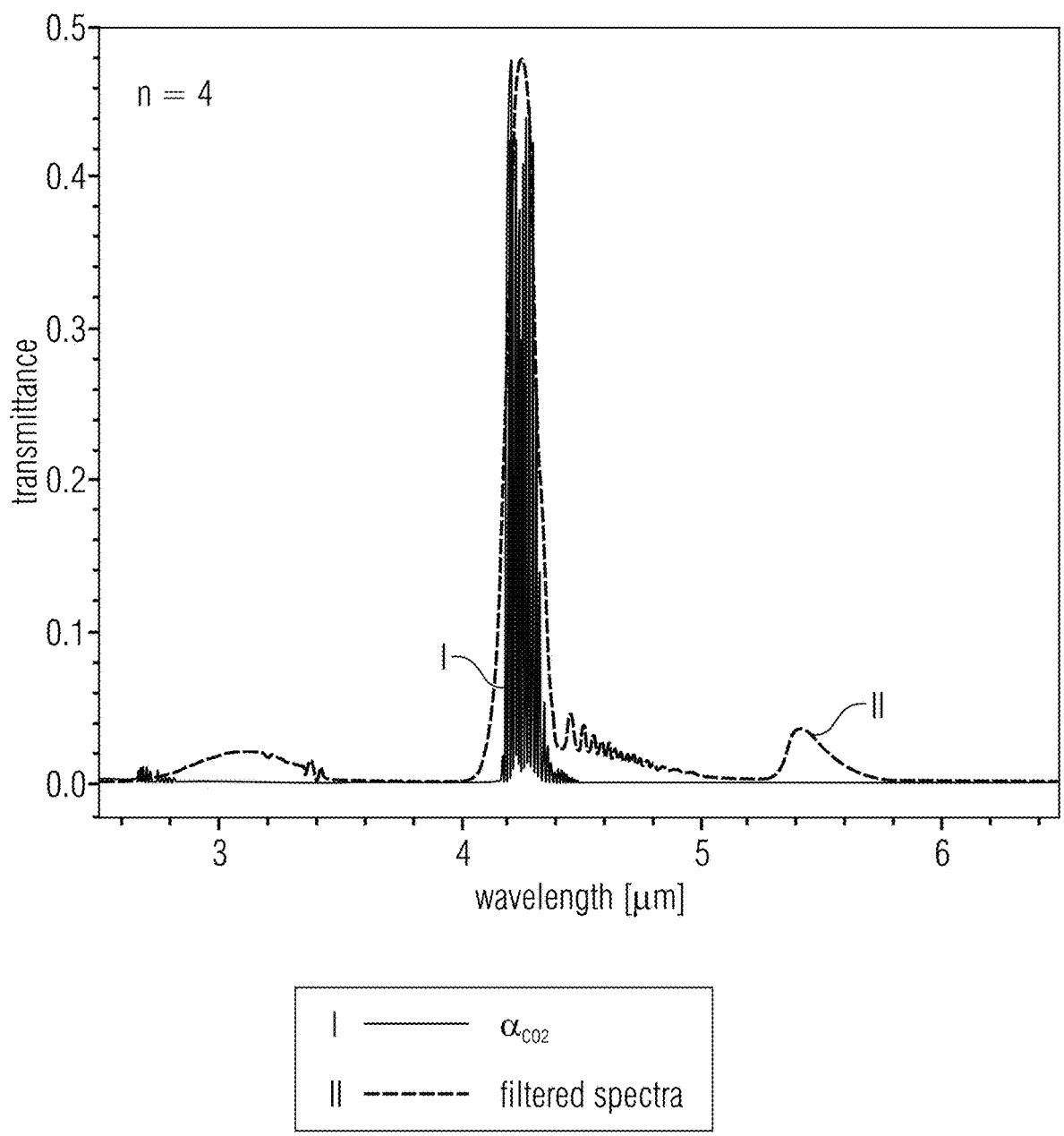
FIGS. 3F-3G show schematic plots of the filtered spectra of the bandpass transmission filter according to an embodiment.
Figure 3G:
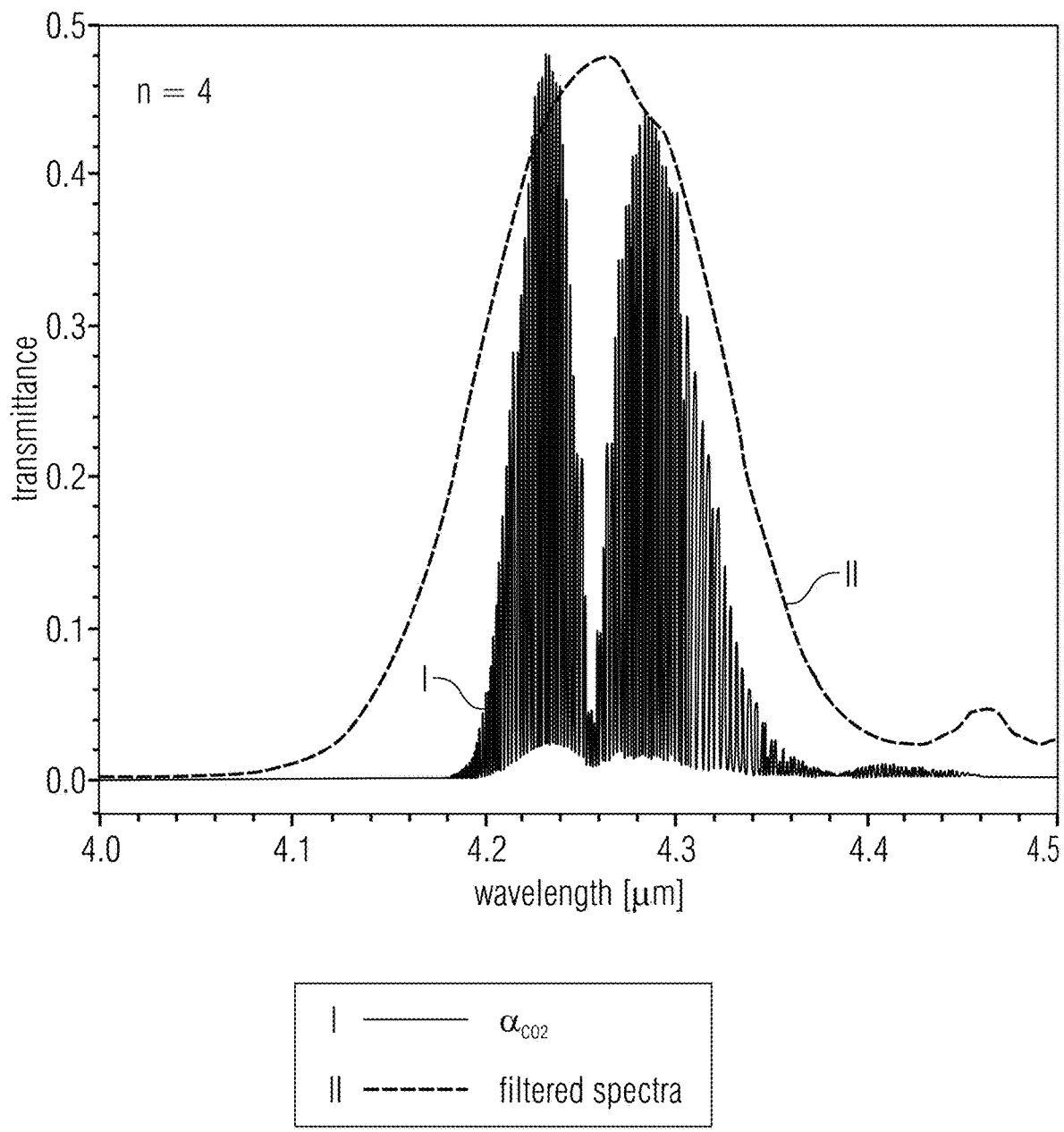

FIGS. 3F-3G show schematic plots of the filtered spectra of the bandpass transmission filter according to an embodiment. Finally, FIG. 3F shows the filtered spectra when the length of the waveguide structure 110, on which the chirped grating structure 120 is placed, is extended by 1.5 mm. The transmittance is calculated using $$T = T_{Grating,n''=f(\lambda)} \cdot T_{WG2.5mm,n''=f(\lambda)}$$

$T_{Grating,n''=f(\lambda)}$ and $T_{WG2.5mm,n''=f(\lambda)}$ based on the data shown in FIG. 3C. The result shows that the side-band transmission can be reduced by increasing the length of the waveguide structure 110, e.g. by means of the waveguide extension structure 110-1, as the waveguide structure 110 has high losses for long wavelengths due to the used materials.

FIG. 3G depicts a zoom of the spectra, shown that the transmission band is centered around the wavelength $\lambda_o=4.26$ µm and covers the whole $CO_2$ absorption band ($\alpha_{CO_2}$).

For designing a bandpass transmission filter 100 for a different wavelength $\lambda O$, the changing or chirped grating structure may be accordingly redesigned on the basis of the above equations. Moreover, the interaction between waveguide 110 characteristics and material properties may be considered in order to achieve the bandpass transmission filter performance.

Figure 4:
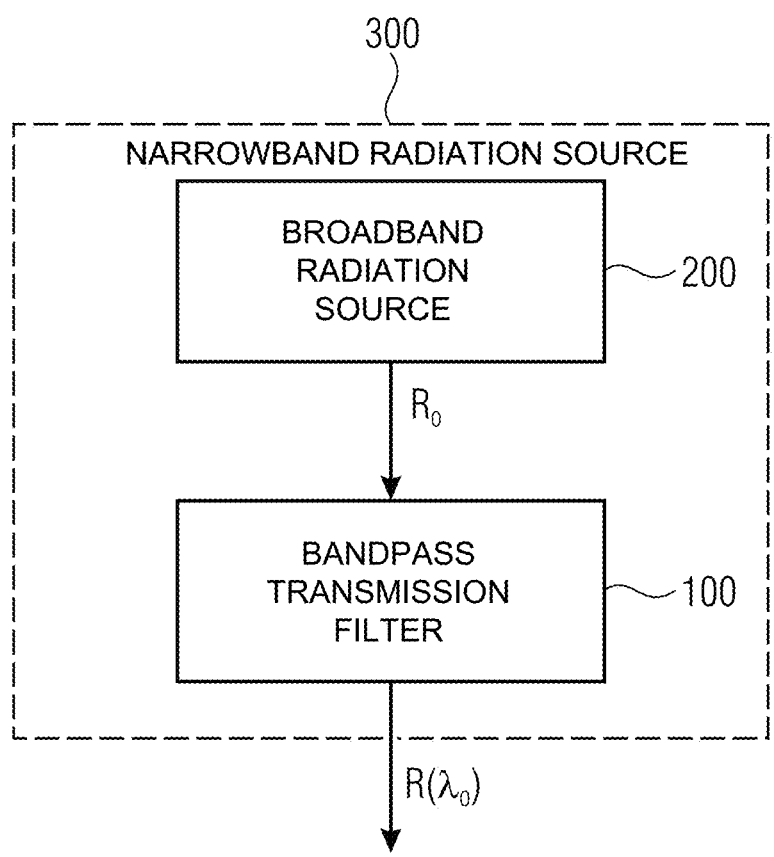
FIG. 4 shows an exemplary block diagram of a narrowband radiation source having the bandpass transmission filter according to an embodiment.

FIG. 4 shows an exemplary block diagram of a narrowband radiation source 300 having the bandpass transmission filter 100 and a broadband radiation source 200, e.g. a thermal emitter, according to an embodiment.

The narrowband radiation source 300 comprises the bandpass transmission filter 100 as described in FIGS. 1A-1B, 2A-2B and 3A-3G above. The narrowband radiation source 300 further comprises a broadband radiation source 200, e.g. a thermal emitter. The bandpass transmission filter 100 is arranged in a radiation R emission direction of the broadband radiation source 200 downstream to the broadband radiation source 200.

The broadband radiation source 200 may be implemented as a thermal IR (IR=infrared) emitter. The IR emitter may comprise a conductive strip, e.g. a semiconductor strip or a highly doped polysilicon material, having a main emission surface region vertical to the bandpass transmission filter 100 for emitting a broadband IR radiation $R_o$ in a main radiation emission direction to the bandpass transmission filter 100. The IR emitter may comprise a metallic cover layer which at least partially covers the main emission surface region of the conductive strip. The IR emitter may form a black body radiator and is configured to have in an actuated condition an operating temperature in a range between 600 and 1000 K, and wherein the IR emitter is connected to a power source for providing the electrical energy to bring the IR emitter in the actuated condition.

The bandpass transmission filter 100 is arranged in an illumination direction downstream to the broadband radiation source 200 and is configured to filter the broadband IR radiation $R_o$ emitted by the IR emitter and to provide a filtered or narrowband IR radiation $R(\lambda_o)$ having a center wavelength $\lambda_o$.

Additional embodiments and aspects are described which may be used alone or in combination with the features and functionalities described herein.

According to an aspect, a bandpass transmission filter having a center wavelength $\lambda_o$ of transmission comprises: a waveguide structure, a grating structure in the waveguide structure, the grating structure having changing grating pitch values $\Lambda_i$ for diffracting a radiation in the waveguide structure having a wavelength $\lambda_1$ which is lower than the center wavelength $\lambda_0$ ($\lambda_1<\lambda_o$), and for reflecting, e.g. a Bragg reflection, a radiation in the waveguide structure having a wavelength $\lambda_2$ which is higher than the center wavelength $\lambda_o$ ($\lambda_2>\lambda_o$), and a radiation absorbing structure, which is an integrated part of the waveguide structure or is formed as a layer arranged adjacent to the waveguide structure, for absorbing a radiation guided by the waveguide structure having a wavelength $\lambda_3$ higher than the wavelength $\lambda_2$, with $\lambda_o<\lambda_2<\lambda_3$. $\lambda_3$.

According to a further aspect, the changing grating pitch values $\Lambda_i$ depend on at least one of a linear function, an exponential function and a polynomial function.

According to a further aspect, the changing grating pitch values $\Lambda_i$ comprise a combination of a basis pitch value "$\Lambda_0$" and a variable pitch value $\Delta\Lambda_i$, wherein the variable pitch value is linearly changing, exponentially changing and/or polynomially changing with "i".

According to a further aspect, the grating structure is a chirped grating structure having monotonically changing grating pitch values $\Lambda_i$.

According to a further aspect, the radiation absorbing structure at least partially covers at least one of a side face, a bottom face and a top face of the waveguide structure having the grating structure.

According to a further aspect, the waveguide structure is arranged on a substrate, wherein a dielectric layer, which forms the radiation absorbing structure, and a further dielectric layer are arranged between the waveguide structure and the substrate, and wherein the further dielectric layer is formed between the dielectric layer and the substrate.

According to a further aspect, the further dielectric layer is formed between the waveguide structure and the substrate, wherein the further dielectric layer has a material thickness for suppressing a coupling of the waveguide mode from the waveguide structure into the substrate.

According to a further aspect, the waveguide comprises a (poly) silicon material or a dielectric material.

According to a further aspect, the waveguide structure comprises a strip waveguide having a side face grating or having a top face grating.

According to a further aspect, the waveguide structure comprises a slot waveguide having a side face grating or having a top face grating.

According to a further aspect, the waveguide structure comprises a strip waveguide having a side face grating or having a top face grating.

According to a further aspect, the waveguide structure is a slab waveguide having a top face grating.

According to a further aspect, the waveguide structure comprises an optical fiber structure.

According to a further aspect, the waveguide structure comprises a waveguide extension structure, wherein the radiation absorbing layer at least partially covers a face of the waveguide extension structure for reducing a sideband transmission of the filter.

According to a further aspect, changing grating pitch values $\Lambda_i$ depend on a linear, e.g. increasing, function with $\Lambda_i=\Lambda_0+\Delta\Lambda\times i$, wherein "$\Lambda_0$" is the basis pitch value and "$\Delta\Lambda\times i$" is the variable pitch value, or a linear, e.g. decreasing, function with $\Lambda_i=\Lambda_0+\Delta\Lambda\times(N-i)$, wherein "$\Lambda_0$" is the basis pitch value and "$\Delta\Lambda\times(N-i)$" is the variable pitch value, or an exponential function with $\Lambda_i=\Lambda_{i0}+(F_1)^i$, wherein "$\Lambda_0$" is the basis pitch value and $(F_1)^i$ is the variable pitch value, or an exponential function with $\Lambda_i=\Lambda_0\times(F_2)^i$, wherein "$\Lambda_0$" is the basis pitch value and $(F_2)^i$ is the variable pitch value, or an polynomial function with $\Lambda_i=\Lambda_0+\Sigma_{k=1}^n \Lambda_k i^k$, wherein "$\Lambda_0$" is the basis pitch value and "$\Sigma_{k=1}^n \Lambda_k i^k$" is the variable pitch value.

According to a further aspect, the basis pitch value "$\Lambda_0$" comprises a center pitch value "$\Lambda_{Center}$" and an additional gap value "$\Lambda_{Gap}$" e.g. to avoid Bragg reflection at the center wavelength $\lambda_o$, and wherein the term "$\Lambda_{Center}$" depends on the function:

$$\Lambda_{Center} = \frac{\lambda m}{2n_{\textit{eff}}},$$

wherein $\lambda_o$ is the center wavelength of transmission, $n_{\textit{eff}}$ is the effective mode index of the mode that propagates in the waveguide structure, and m is the diffraction order.

According to a further aspect, the i-th grating pitch value $\Lambda_i$ is repeated N-times with N=2, 3, 4, 5, 6, 7, 8, . . . , e.g. at least 4 times with N≥4.

According to a further aspect, the center pitch "$\Lambda_{Center}$" is 753 nm (between 700-800 nm), the gap "$\Lambda_{Gap}$" is 18 nm (between 15-21 nm), the variation for the pitches ΔΛ is 2 nm (between 1.5-2.5 nm) or $F_1$=1.05 (between 1.2 and 1,001) or $F_2$=1.003 (between 1.03 and 1,0003), and the number of periods i is 120 (between 80-160), for achieving the center wavelength $\lambda_o$ of transmission with $\lambda_o$=4.26 μm (between 4.1 and 4.4 μm).

According to a further aspect, the dielectric layer comprises a $Si_3N_4$ material, wherein the further dielectric layer comprises a $SiO_2$ material, and wherein the waveguide structure comprises a (poly) silicon material or a dielectric material.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. A bandpass transmission filter having a center wavelength of transmission, the bandpass transmission filter comprising:
   a waveguide structure arranged on a substrate, the waveguide structure comprising a grating structure comprising a side face grating or a front face grating, and comprising changing grating pitch values configured to diffract out radiation in the waveguide structure having first wavelengths lower than a center wavelength of transmission, and configured to reflect back guided radiation in the waveguide structure having a second wavelength higher than the center wavelength of transmission; and
   a radiation absorbing structure configured to absorb radiation guided by the waveguide structure having a third wavelength higher than the second wavelength, wherein:
      the radiation absorbing structure comprises a first dielectric layer arranged adjacent to the waveguide structure,
      the radiation absorbing structure at least partially covers at least one of a side face, a bottom face and a top face of the waveguide structure with the grating structure,
      a second dielectric layer is formed between the waveguide structure and the substrate,
      the waveguide structure comprises a polysilicon (Poly-Si), Si, Ge, $Si_3N_4$, AlN, or $As_2Se_3$ material,
      the first dielectric layer comprises a $Si_3N_4$ material, and
      the second dielectric layer comprises a $SiO_2$ material.

2. The bandpass transmission filter according to claim 1, wherein the changing grating pitch values depend on at least one of a linear function, an exponential function or a polynomial function.

3. The bandpass transmission filter according to claim 1, wherein the changing grating pitch values comprise a combination of a basis pitch value and a variable pitch value, wherein the variable pitch value changes linearly, exponentially or polynomially.

4. The bandpass transmission filter according to claim 1, wherein the grating structure comprises a chirped grating structure having monotonically changing grating pitch values.

5. The bandpass transmission filter according to claim 1, wherein:
   the first dielectric layer is arranged between the waveguide structure and the substrate, and the second dielectric layer is arranged between the first dielectric layer and the substrate.

6. The bandpass transmission filter according to claim 5, wherein the second dielectric layer has a material thickness for suppressing a coupling of a waveguide mode from the waveguide structure into the substrate.

7. The bandpass transmission filter according to claim 1, wherein the waveguide structure comprises a strip waveguide having the side face grating or the top face grating.

8. The bandpass transmission filter according to claim 1, wherein the waveguide structure comprises a slot waveguide having the side face grating or the top face grating.

9. The bandpass transmission filter according to claim 1, wherein the waveguide structure is a slab waveguide having the top face grating.

10. The bandpass transmission filter according to claim 1, wherein the waveguide structure comprises a waveguide extension structure without having arranged thereon a chirped grating structure, wherein the radiation absorbing structure at least partially covers a face of the waveguide extension structure for reducing a sideband transmission of the bandpass transmission filter.

11. The bandpass transmission filter according to claim 1, wherein the changing grating pitch values $\Lambda\_i$ depend on a combination of a basis pitch value and a variable pitch value, and wherein the variable pitch value changes according to:
- a linear function with $\Lambda\_i=\Lambda\_o+\Delta\Lambda\times i$, wherein "$\Lambda\_o$" is the basis pitch value and "$\Delta\Lambda\times i$" is the variable pitch value, or
- a linear function with $\Lambda\_i=\Lambda\_o+\Delta\Lambda\times(N-i)$, wherein "$\Lambda\_o$" is the basis pitch value and "$\Delta\Lambda\times(N-i)$" is the variable pitch value, or
- an exponential function with $\Lambda\_i=\Lambda o+[(F\_1)]^{\wedge}i$, wherein "$\Lambda\_o$" is the basis pitch value and $[(F\_1)]^{\wedge}i$ is the variable pitch value, or
- an exponential function with $\Lambda\_i=\Lambda\_o\times[(F\_2)]^{\wedge}i$, wherein "$\Lambda\_o$" is the basis pitch value and $[(F\_2)]^{\wedge}i$ is the variable pitch value, or
- an polynomial function with $\Lambda\_i=\Lambda\_o+\Sigma\_(k=1)^{\wedge}n[\Lambda\_k\, i^{\wedge}k]$, wherein "$\Lambda\_o$" is the basis pitch value and "$\Sigma\_(k=1)^{\wedge}n[\Lambda\_k\, i^{\wedge}k]$" is the variable pitch value.

12. The bandpass transmission filter according to claim 11, wherein the basis pitch value "$\Lambda\_o$" comprises a center pitch value "$\Lambda\_Center$" and an additional gap value "$\Lambda\_Gap$", and wherein the term "$\Lambda\_Center$" depends on the function:

$$\Lambda\_Center = \lambda m / [2n]\_{eff},$$

wherein $\lambda_m$ is the center wavelength of transmission, $n_{eff}$ is an effective mode index of a mode that propagates in the waveguide structure, and m is the diffraction order, and wherein the additional gap value "$\Lambda\_Gap$" is provided to avoid Bragg reflections of the guided radiation at the center wavelength.

13. The bandpass transmission filter according to claim 1, wherein an i-th grating pitch value $\Lambda\_i$ of the grating pitch values is repeated N-times where N is an integer greater or equal to 4.

14. A narrowband radiation source comprising:
the bandpass transmission filter of claim 1, further comprising a broadband radiation source,
wherein the bandpass transmission filter is arranged in a radiation emission direction of the broadband radiation source downstream to the broadband radiation source.

15. The narrowband radiation source according to claim 14, wherein the radiation absorbing structure is integrated with the waveguide structure.

16. A method, comprising:
generating broadband radiation using a thermal emitter; and
filtering the broadband radiation to produce narrowband radiation using the bandpass transmission filter of claim 1.

* * * * *